US012585121B2

(12) United States Patent
Danziger et al.

(10) Patent No.: US 12,585,121 B2
(45) Date of Patent: Mar. 24, 2026

(54) NEAR-EYE DISPLAY HAVING OVERLAPPING PROJECTOR ASSEMBLIES

(71) Applicant: Lumus Ltd., Ness Ziona (IL)

(72) Inventors: Yochay Danziger, Kfar Vradim (IL); Naamah Levin, Rehovot (IL); Daniel Michaels, Ramat Gan (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/892,815

(22) Filed: Sep. 23, 2024

(65) Prior Publication Data

US 2025/0013055 A1      Jan. 9, 2025

Related U.S. Application Data

(63) Continuation of application No. 18/224,087, filed on Jul. 20, 2023, now Pat. No. 12,099,196, which is a continuation of application No. 17/943,342, filed on Sep. 13, 2022, now Pat. No. 11,719,943, which is a continuation of application No. 16/981,364, filed as application No. PCT/IB2019/054062 on May 16, 2019, now Pat. No. 11,442,273.

(60) Provisional application No. 62/750,269, filed on Oct. 25, 2018, provisional application No. 62/672,635, filed on May 17, 2018.

(51) Int. Cl.
| | |
|---|---|
| *G09G 5/00* | (2006.01) |
| *G02B 27/00* | (2006.01) |
| *G02B 27/01* | (2006.01) |

(52) U.S. Cl.
CPC ..... *G02B 27/0172* (2013.01); *G02B 27/0093* (2013.01); *G02B 2027/0123* (2013.01)

(58) Field of Classification Search
CPC ........... G02B 27/0172; G02B 27/0093; G02B 2027/0123
USPC .......................................................... 345/8
See application file for complete search history.

(56) References Cited

U.S. PATENT DOCUMENTS

| | | | | |
|---|---|---|---|---|
| 2013/0083403 A1* | 4/2013 | Takagi | ............... | G02B 27/0172 |
| | | | | 29/592 |
| 2019/0155034 A1* | 5/2019 | Singer | .................. | G02B 6/0076 |
| 2019/0377181 A1* | 12/2019 | Myhre | ............... | G02B 27/0172 |
| 2020/0355924 A1* | 11/2020 | Dobschal | ........... | G02B 27/0172 |

* cited by examiner

*Primary Examiner* — Jonathan M Blancha
(74) *Attorney, Agent, or Firm* — Rivka Friedman

(57) ABSTRACT

A display and method for providing an image to an eye of a viewer is provided. The display comprises at least two projector assemblies. Each projector assembly comprises a light-guide optical element (LOE), and an image projector arrangement for generating a partial image and being deployed to introduce the partial image into the LOE for coupling out towards the eye of the viewer. The at least two projector assemblies cooperate to display the image to the eye of the viewer with partial overlap. The display further comprises a controller associated with the image projector arrangements and configured to reduce a pixel intensity of selected pixels in a region of partial overlap between the first and second part of the image so as to enhance a perceived uniformity of the image.

5 Claims, 10 Drawing Sheets

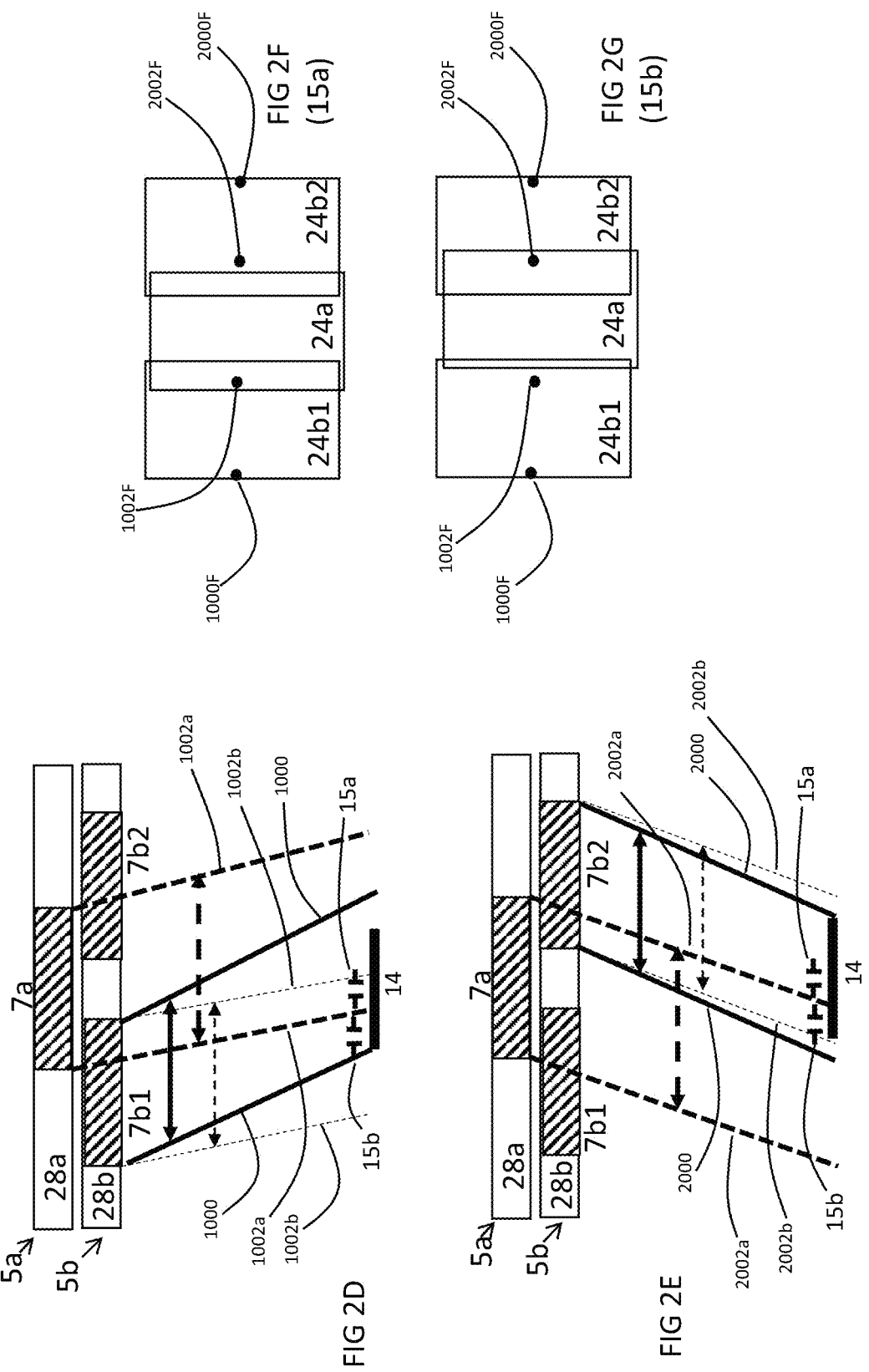

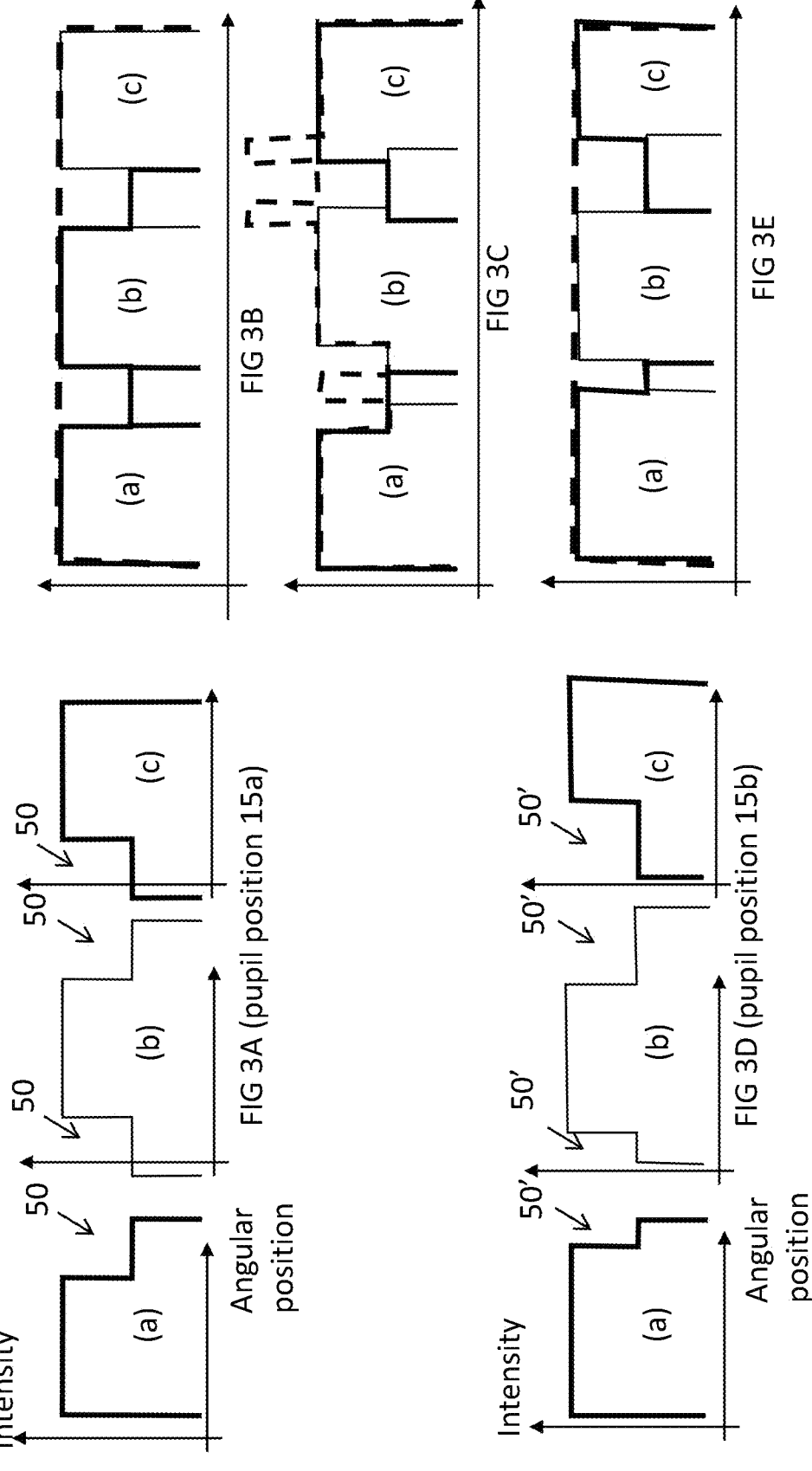

Detect the pupil position of the viewer's eye
86

Determine, at each different pupil position, determine a subset of pixels in the overlapping region of the image viewed by the viewer
88

Reduce the intensity of the pixels in the determined subset
90

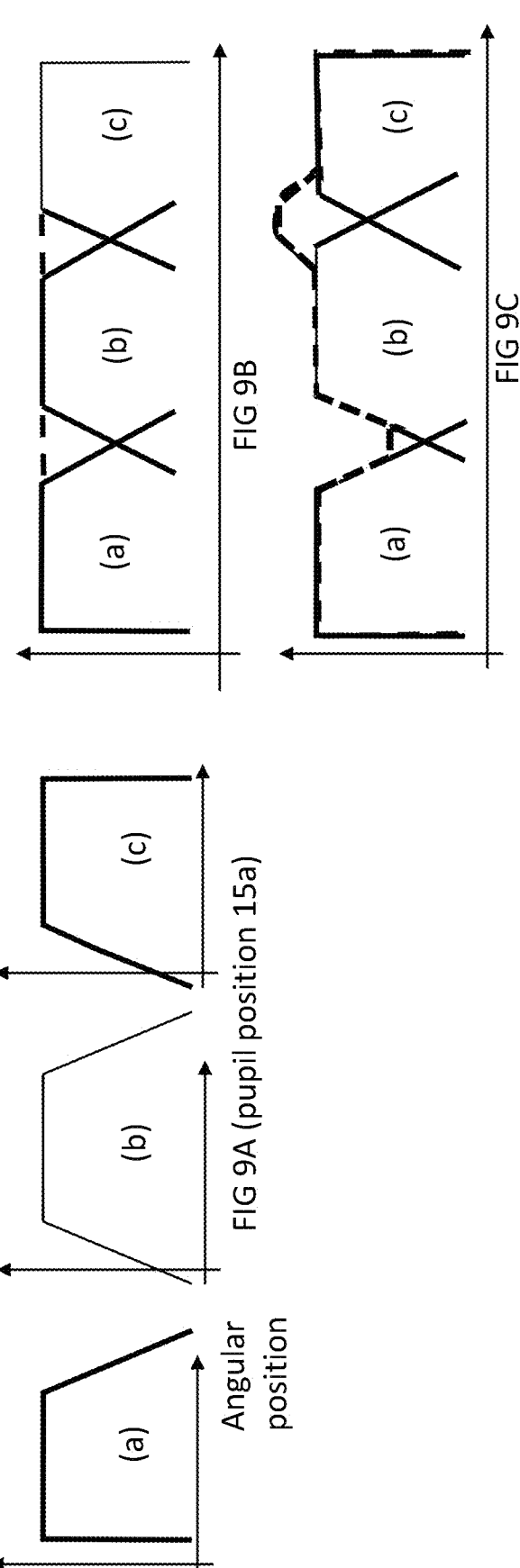

NEAR-EYE DISPLAY HAVING OVERLAPPING PROJECTOR ASSEMBLIES

FIELD AND BACKGROUND OF THE INVENTION

The present invention relates to a display and, in particular, it concerns a display for providing an image to the eye of a viewer.

For applications such as near-eye displays, a projected image having a large field is desirable. This is typically achieved by injecting a large field image into a waveguide from a single image projector. The waveguide expands the aperture of the projected image, thereby illuminating the eye with a large field image.

However, in order to achieve such aperture expansion, a large projector and/or large optics are typically required, which is disadvantageous for use in near-eye displays and other applications where the display must be small in order to be useable in the desired application. Additionally, the angular dimensions of the field of view from a given waveguide and coupling-out arrangement are limited by geometrical optics considerations such as the range of angles which can be trapped within the waveguide so as to propagate by internal reflection, and avoidance of overlap between an image and its conjugate within the waveguide.

SUMMARY OF THE INVENTION

According to the teachings of the present invention there is provided, a display for providing an image to an eye of a viewer, the display including: (a) at least two projector assemblies, each projector assembly including: (i) a light-guide optical element (LOE) having a pair of parallel external surfaces, and (ii) an image projector arrangement generating a partial image, the image projector arrangement being deployed to introduce the partial image from the image projector arrangement into the LOE so as to propagate within the LOE by internal reflection from the pair of parallel external surfaces, each projector assembly including a coupling-out arrangement associated with the LOE and configured for coupling out the partial image from the LOE towards the eye of the viewer, wherein the LOE of a first of the projector assemblies is deployed in overlapping relation with the LOE of a second of the projector assemblies such that the first projector assembly projects a first partial image corresponding to a first part of the image, and the second projector assembly projects a second partial image corresponding to a second part of the image, the first and second part of the image having partial overlap so that the at least two projector assemblies cooperate to display the image to the eye of the viewer; and (b) a controller including at least one processor, the controller being associated with the image projector arrangement of at least the first and second projector assemblies, and configured to reduce a pixel intensity of selected pixels projected by at least one of the first and second image projector arrangements, the selected pixels being in a region of the partial overlap between the first and second part of the image so as to enhance a perceived uniformity of the image.

According to the teachings of the present invention there is further provided, display for providing an image to an eye of a viewer, the display including: (a) a projector assembly including: (i) a light-guide optical element (LOE) having a pair of parallel external surfaces, and two non-parallel sets of mutually parallel reflective surfaces, the LOE being configured for 2D aperture expansion of an image propagating through it, (ii) at least two image projector arrangements generating at least two partial images corresponding to at least a first part of the image and at least a second part of the image, respectively, the at least two image projector arrangements being deployed to introduce the at least two partial images into the LOE so as to propagate the at least two partial images within the LOE by internal reflection from the pair of parallel external surfaces, the projector assembly including a coupling-out arrangement associated with the LOE and configured for coupling out the partial images from the LOE towards the eye of the viewer, wherein the at least a first part of the image and at least a second part of the image have partial overlap so that the at least two projector assemblies cooperate to display the image to the eye of the viewer; and (b) a controller including at least one processor, the controller being associated with the at least two image projector arrangements, and configured to reduce a pixel intensity of selected pixels projected by at least one of the first and second image projector arrangements, the selected pixels being in a region of the partial overlap between the first and second part of the image so as to enhance a perceived uniformity of the image.

According to the teachings of the present invention there is further provided method of providing an image to an eye of a viewer, including: generating, by a first projector assembly including a first LOE and a first image projector arrangement, a first partial image corresponding to a first part of the image for coupling out to the viewer; generating, by a second projector assembly including a second LOE and a second image projector arrangement, a second partial image corresponding to a second part of the image for coupling out to the viewer, wherein the first and second LOEs are deployed in overlapping relation such that the first and second part of the image are coupled out to the viewer having partial overlap so that the projector assemblies cooperate to display the image to the eye of the viewer; determining, by a controller associated with the first and second image projector arrangements, a subset of pixels in a region of the partial overlap; and reducing, by the controller, the intensity of selected pixels in the subset of pixels, the selected pixels being projected by at least one of the first and second image projector arrangements, so as to enhance the perceived uniformity of the image.

According to some aspects of the present invention, the display includes at least a third projector assembly, the at least a third projector assembly including: (i) a LOE having a pair of parallel external surfaces, and (ii) an image projector arrangement generating a third partial image corresponding to a third part of the image and being deployed to introduce the third part of the image from the image projector arrangement into the LOE so as to propagate within the LOE by internal reflection from the pair of parallel external surfaces, the at least a third projector assembly including a coupling-out arrangement associated with the LOE and configured for coupling out the third partial image from the LOE towards the eye of the viewer, wherein the LOE of the at least a third projector assembly is deployed in overlapping relation with the LOE of at least one of the first and second projector assembly such that the at least three projector assemblies cooperate to display the image to the eye of the viewer, wherein the controller is further associated with the image projector arrangement of the at least a third projector assembly and configured to reduce a pixel intensity of selected pixels projected by at least one image projector arrangement of at least one of the projector assemblies, the selected pixels being a region of partial overlap between at least two parts of the image.

According to some aspects of the present invention, the first partial image and the second partial image share a set of common pixels, and wherein the selected pixels of reduced intensity are a subset of the set of common pixels.

According to some aspects of the present invention, the controller varies the selection of the subset of the set of common pixels responsively to an overlap region adjustment input.

According to some aspects of the present invention, the overlap region adjustment input is derived from a pupil position sensor.

According to some aspects of the present invention, the overlap region adjustment input is derived from a manual user input.

According to some aspects of the present invention, the controller is configured to gradually reduce the intensity of the selected pixels projected by the first projector arrangement across the region of partial overlap, and to gradually increase the intensity of the selected pixels projected by the second projector arrangement across the region of partial overlap.

According to some aspects of the present invention, the second projector assembly includes a second image projector arrangement generating a third partial image corresponding to a third part of the image, and being deployed to introduce the third partial image into the LOE of the second projector assembly such that the first, second and third parts of the image have partial overlap, and wherein the controller is further associated with the second image projector arrangement and configured to reduce a pixel intensity of selected pixels projected by at least one image projector arrangement of at least one of the projector assemblies, the selected pixels being a region of partial overlap between at least two parts of the image.

According to some aspects of the present invention, the LOEs of the at least two projector assemblies are deployed parallel to one another.

According to some aspects of the present invention, the LOEs of the at least two projector assemblies are deployed non-parallel to one another.

According to some aspects of the present invention, the LOEs are deployed to extend around or partially encompass the viewer or an eye of the viewer, the display further including one or more index-matched mediums deployed around the viewer between the LOEs forming an optically smooth transition with edges of the LOE.

BRIEF DESCRIPTION OF THE DRAWINGS

The invention is herein described, by way of example only, with reference to the accompanying drawings, wherein:

FIGS. 2D-2E illustrate schematically a cross-sectional view of the projector assemblies and coupling-out towards different pupil positions;

FIG. 2F illustrates schematically selected points in the projected fields in angular space at the first pupil position;

FIG. 2G illustrates schematically selected points in the projected fields in angular space at the second pupil position;

FIGS. 3A-3E illustrate examples of angular power intensity distribution of projected images;

FIGS. 9A-9C illustrate examples of angular power intensity distribution of projected images according to alternative embodiments.

DESCRIPTION OF THE PREFERRED EMBODIMENTS

The present invention provides a display for projecting large field images using small sized optics by projecting a plurality of partial, narrow field images to be combined and viewed by the viewer as a single, large field image.

The term "field" as used herein should be understood to refer to the field of view of a projected image.

The term "eye-box" as used herein should be understood to refer to the general area where a pupil is expected to be while viewing an image. It is expected that the actual pupil position within the eye-box will vary across different viewers (e.g. based on interpupillary distance ("IPD")), and even for a given viewer at different times (e.g. based on eyeball rotation).

The principles and operation of the display according to the present invention may be better understood with reference to the drawings and the accompanying description.

Figures 1A, 1B, 1C:
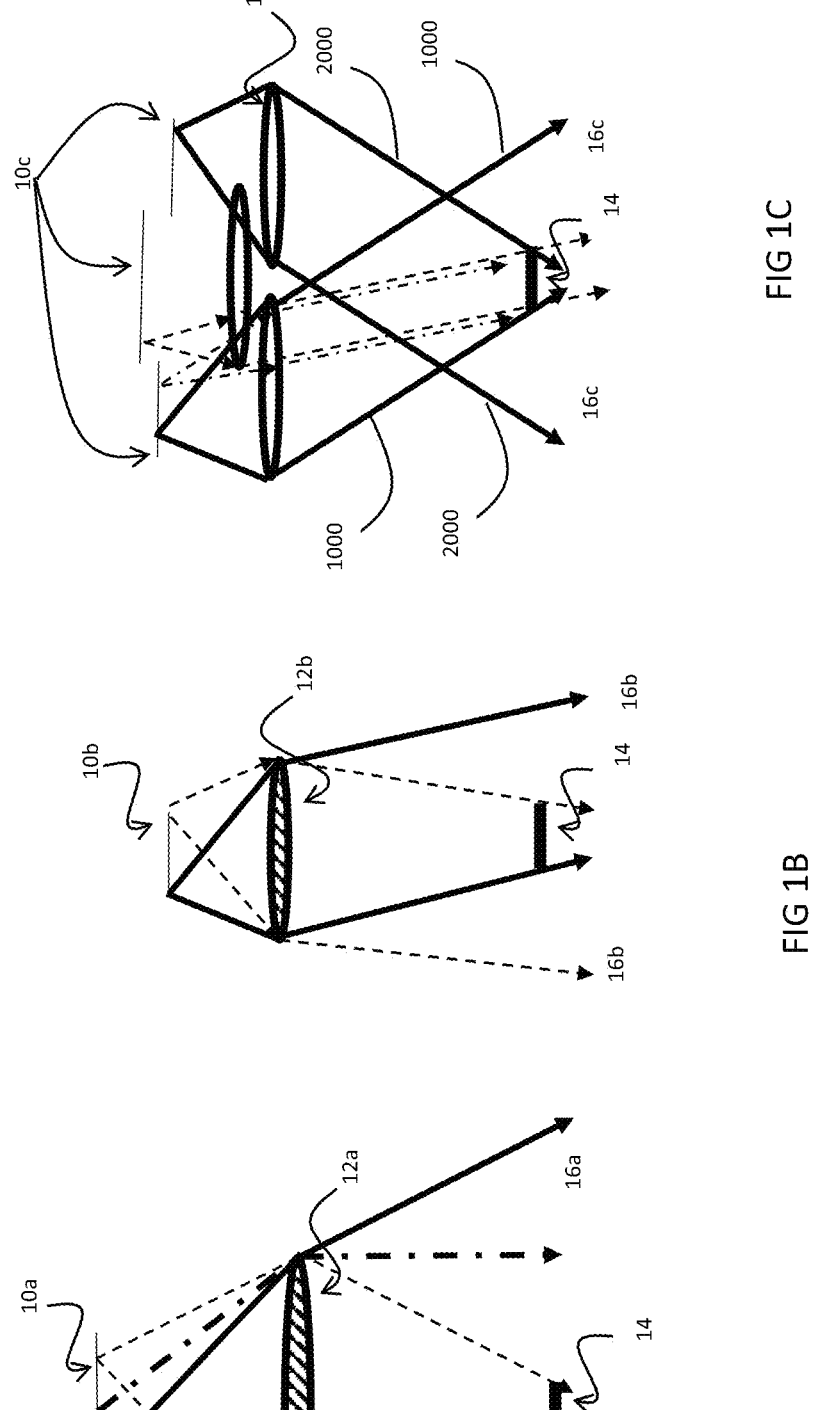
FIG. 1A illustrates schematically projecting a wide field onto an eye-box.
FIG. 1B illustrates schematically projecting a narrow field onto an eye-box.
FIG. 1C illustrates schematically projecting a combination of narrow fields onto an eye-box.

Referring now to the drawings, FIG. 1A illustrates schematically projecting a wide field onto an eye-box. Image generator 10a transmits light rays onto optics 12a that collimate the light rays and illuminate eye-box 14. As apparent from FIG. 1A, to generate an image with a large field, optics 12a must be relatively large. As also apparent from FIG. 1A, a substantial amount of light rays 16a transmitted through optics 12a fall outside eye-box 14 and hence are "wasted" in the sense of being unviewable by the pupil.

FIG. 1B illustrates schematically projecting a narrow field onto an eye-box. For a narrow field, image generator 10b and optics 12b can be smaller compared to the image generator and optics required to project a large field (as in FIG. 1A). Additionally, most of the collimated light rays reach eye-box 14, with fewer light rays 16b falling outside the eye-box 14 relative to FIG. 1A. However, the field will be relatively narrow as compared to that of FIG. 1A, (and also narrower than a person's natural view of the world) leaving the viewer with a less than desirable image viewing experience.

FIG. 1C illustrates schematically projecting a combination of narrow fields onto an eye-box. A plurality of image generators 10c are used in combination with one another, with each individual image generator projecting a narrow field partial image such that the final image reaching eye-box 14 is a much wider field image. As apparent from FIG. 1C, image generators 10c and optics 12c can be small (as in FIG. 1B), leading to fewer light rays 16c that fall outside eye-box 14, yet the viewer still advantageously views a wide field image, i.e. the combined plurality of narrow field partial images. In FIG. 1C the dashed lines represent overlapping image data (dashed from center image generator and dot-dashed from left generator) that is preferably implemented in order to generate a perception of continuity to the observer. Because of physical limitations, this overlap cannot be generated by conventional optics without cross obscuration. According to an aspect of this invention, a light-guide optical element ("LOE") (also referred to herein as a "waveguide") is used to generate this overlap without obscuration. The waveguide has a pair of parallel external surfaces for total internal reflection of light rays introduced to it.

Image Projection and Combination

Figures 2A, 2B, 2C:
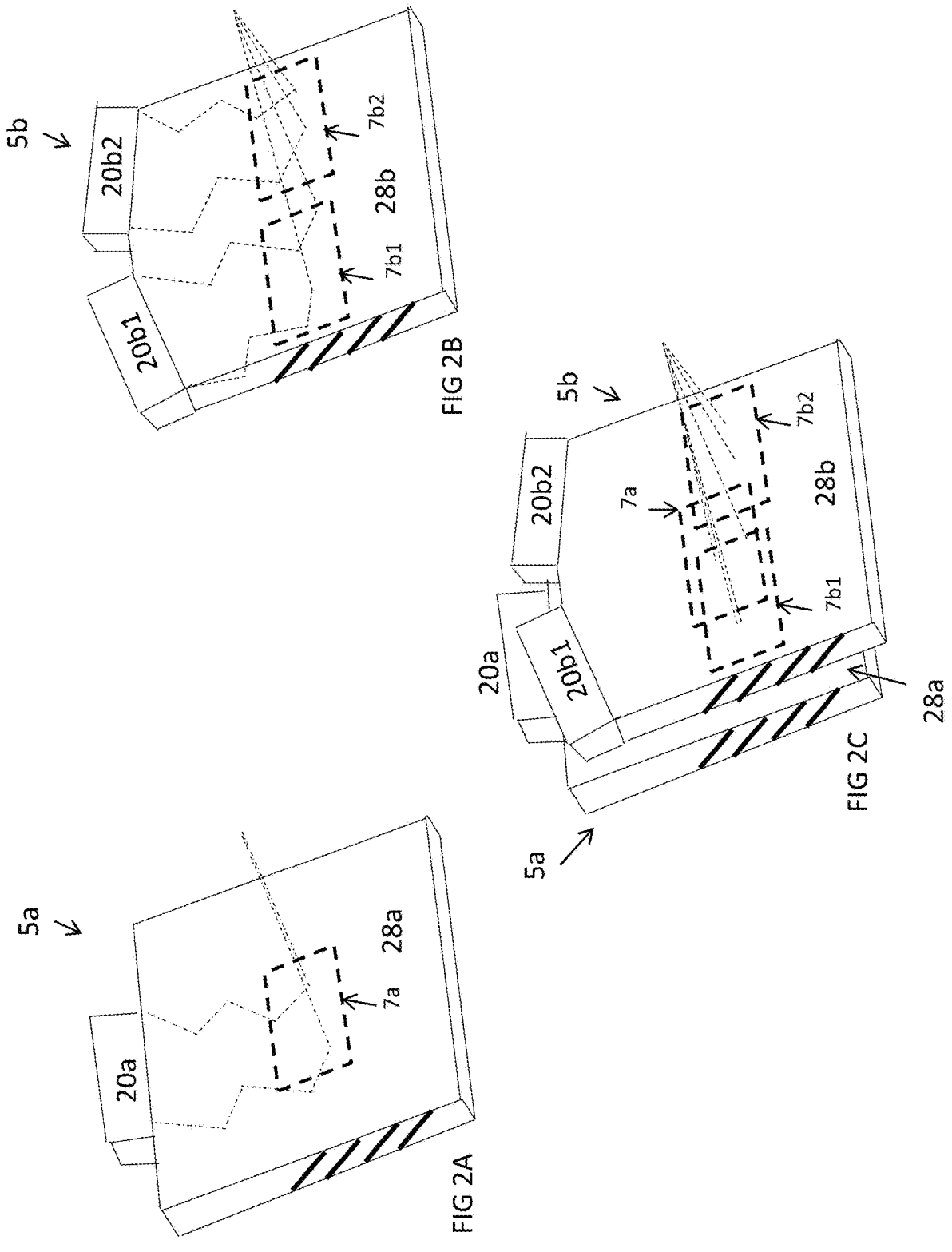
FIG. 2A illustrates schematically a first projector assembly have a LOE and an image projector arrangement.
FIG. 2B illustrates schematically a second projector assembly have a LOE and two image projector arrangement.
FIG. 2C illustrates schematically a display of the present invention according to some embodiments.

FIG. 2A illustrates schematically a first embodiment of a projector assembly 5a have a LOE 28a and an image projector arrangement 20a. The image is shown as dashed lines representing lights rays. Image projector arrangement 20a generates and projects a partial image, and couples the partial image into waveguide 28a. In some embodiments, the image projector arrangement includes a light source, spatial light modulator (such as a liquid crystal on silicon, or "LCOS") and collimating optics. These components may advantageously be arranged on surfaces of a number of beam splitter prisms, for example, polarized beam splitter (PBS) cubes, as is known in the art.

Image projector arrangement 20a is deployed to introduce the partial image into the waveguide so as to propagate the partial image within the waveguide by internal reflection from the pair of parallel external surfaces. The introduction of the partial image into the waveguide is achieved via a suitable optical arrangement, referred to as a coupling-in arrangement, which typically includes a prism with suitably angled surfaces associated with a side edge of the LOE or one of the major surfaces of the LOE and/or one or more coupling-in reflectors which may be located within the LOE or associated with one of the surfaces thereof. Details of the image projector arrangement, including the coupling-in arrangement, are omitted from the schematic drawings for simplicity of presentation of the invention. A coupling-out arrangement 7a (shown as dashed rectangles on the LOE) associated with LOE 28a is deployed to couple-out the partial image from the waveguide towards the eye of the viewer.

In some embodiments, the projector arrangement 20a can be a wide optical arrangement, or may include a distinct optical arrangement for lateral aperture expansion. The coupling-out arrangement 7 is typically implemented as one or more sets of obliquely-angled, mutually-parallel internal partially reflecting surfaces, or as a diffractive optical element, all as is known in the art. The general region of the LOE from which the image illumination is coupled-out towards the eye of the viewer is designated by dashed lines.

FIG. 2B illustrates schematically a second embodiment of a projector assembly 5b have a LOE 28b and two image projector arrangements 20b1 and 20b2. The two image projector arrangements 20b1 and 20b2 generate and project distinct partial images (shown as dashed lines representing lights rays). The partial images are coupled-in to waveguide 28b, such that each partial image is coupled-out (via respective coupling-out arrangements 7b1 and 7b2) towards the viewer. The partial images are coupled-in to waveguide at different angles relative to the waveguide so that coupled-out images do not overlap. It is apparent from FIG. 2B that there is a gap between the apertures of the image projector arrangements, leading to a corresponding gap in the coupled-out partial images.

FIG. 2C illustrates schematically an embodiment of a display 70 according to the present invention. The display 70 is implemented via a combination of projector assembly 5a (FIG. 2A) and projector assembly 5b (FIG. 2B), although in principle there can be more than two projector assemblies. Projector assembly 5a includes image projector arrangement 20a and LOE 28a. Image projector arrangement 20a is configured to generate and project a first partial image corresponding to a first part of the image. Image projector arrangement 20a is deployed to introduce the first partial image into LOE 28a so as to propagate the first partial image within the LOE by internal reflection from the LOE's pair of parallel external surfaces. A coupling-out arrangement 7a (shown as dashed rectangles on the LOE) associated with LOE 28a is deployed to couple-out the first partial image from the waveguide towards the eye of the viewer.

Projector assembly 5b includes image projector arrangements 20b1 and 20b2, and LOE 28b. Image projector arrangement 20b1 is configured to generate and project a second partial image corresponding to a second part of the image. Image projector arrangement 20b2 is configured to generate and project a third partial image corresponding to a third part of the image. Image projector arrangements 20b1 and 20b2 are deployed to introduce the second and third partial images, respectively, into LOE 28b2 so as to propagate the partial images within the LOE by internal reflection from the LOE's pair of parallel external surfaces. Coupling-out arrangements 7b1, 7b2 (shown as dashed rectangles on the LOE) associated with LOE 28b are deployed to couple-out the second and third partial images, respectively, from the waveguide towards the eye of the viewer. Note that coupling-out arrangement 7a is in practice associated with projector assembly 5a, but shown in FIG. 2C here on projector assembly 5b in order to illustrate the overlapping effect of the coupled-out partial images.

In the embodiment shown in FIG. 2C, the first partial image (projected by image projector arrangement 20a) partially overlaps the second partial image (projected by image projector arrangement 20b1) and the third partial image (projected by image projector arrangement 20b2). LOEs 28a and 28b are deployed in overlapping relation with respect to one another such that projector assemblies 5a and 5b cooperate to display the image to an eye of the viewer.

It should be noted that while LOE 28a is shown as being located behind LOE 28b, in principle LOE 28a could alternatively be in front of LOE 28b. Preferably, LOEs 28a and 28b should be as close to one another as possible, though an air gap, or a layer simulating an air gap, is typically required in order to maintain the light guiding properties of the LOE. In some embodiments, if the image projector arrangement is wider than its associated waveguide such that part of the image projector will extend over the side of the LOE, it is preferable to have image projector arrangements 20b1 and 20b2 extend over opposing sides of the LOE.

Preferably, the field and aperture continuity as well as pixel intensity uniformity should be maintained when the viewer's pupil is at different positions in the eye-box.

While it should be readily apparent from FIG. 2C that the projector assemblies couple-out overlapping partial images, it may be less apparent that not all of the overlapping pixels coupled-out to the viewer will illuminate the pupil, as will now be detailed below with reference to FIGS. 2D-2E.

FIGS. 2D and 2E illustrate schematically a cross-sectional top-down view of projector assemblies 5a and 5b, showing partially overlapping partial images coupled out towards eye-box 14. FIG. 2D shows ray directions corresponding to two pixels in the left half of the overall field of view, which are generated by projector arrangements 20a and 20b1, and coupled-out by coupling-out arrangements 7a and 7b1, respectively. FIG. 2E shows ray directions corresponding to two pixels in the right half of the overall field of view, which are generated by projector arrangements 20a and 20b2, and coupled-out by coupling-out arrangements 7a and 7b2, respectively. These pixels have been chosen to facilitate an understanding of certain aspects of the present invention, but it will be understood that, during use, all pixels of the overall image are coupled out to the viewer concurrently. Two possible pupil positions 15a and 15b are shown in each of FIGS. 2D and 2E.

FIGS. 2F and 2G correspond to FIGS. 2D and 2E and illustrate schematically selected points (pixels) in the projected fields in angular space as would be observed by a pupil at each of pupil position 15a (shown in FIG. 2F) and pupil position 15b (shown in FIG. 2G). FIGS. 2F and 2G demonstrate the variance in the perceived image according to the viewer's pupil position.

The terms "overlap region", "region(s) of overlap", and "region of partial overlap" will now be used to refer to image data that is simultaneously projected by more than one image project arrangement. As noted, typically a subset of the pixels within the region of overlap will illuminate the pupil from both projectors at any given time (the other pixels reaching the eye from only one projector while light from the other falls to the left or right of the pupil).

Referring now to FIGS. 2F and 2G, pixels 1000F, 1002F, 2002F and 2000F are produced by light rays 1000, 1002a/b, 2002a/b and 2000, respectively (shown in FIGS. 2D-2E). In FIGS. 2F and 2G, similarly numbered pixels correspond to identical image information, as shown by their being positioned, in both FIGS. 2F and 2G, at identical locations within the field of the image.

Referring now to FIG. 2F, pixel 1002F is simultaneously coupled-out towards the viewer by light ray 1002a and light ray 1002b from (originating from image projector arrangements 20a and 20b1, respectively). Both of these light rays illuminate the pupil. On the other hand, pixel 2002F is also simultaneously coupled-out towards the viewer by two light rays, being light rays 2002a and 2002b (originating from image projectors 20a and 20b2, respectively). However, in this case, only light ray 2002b illuminates the pupil.

By contrast, the opposite is true when the pupil is at pupil position 15b, where for pixel 1002F only light ray 1002b illuminates the pupil, while for pixel 2002F both light rays 2002a and 2002b illuminate the pupil.

Thus, for pupil position 15a, the "selected pixels" within the region of overlap preferably include pixel 1002F but not 2002F. For pupil position 15b, the selected pixels within the region of overlap preferably include pixel 2002F but not 1002F.

Note that at both of pupil positions 15a and 15b, neither pixel 1000F nor 2000F are included in the overlapping region because each of these pixels originates from one image projector arrangement.

This demonstrates although the overlapping regions of the image are fixed according to the configuration of the projector assemblies, typically only a subset of pixels within the overlapping region will illuminate the pupil from two projectors at a given time based on the viewer's pupil position.

Pixel Intensity Reduction

It should be appreciated that light rays that reach the pupil from two sources will produce pixels having nearly twice the intensity compared to other pixels produced from one source, leading to a perceived non-uniformity in the viewed image. To address this non-uniformity, it is desirable to reduce the intensity of these pixels. However, as already pointed out above, the number of projector arrangements from which illumination arrives at the viewer's pupil for various pixels in the region of overlap between the partial images will vary according to the pupil position across the eye-box. An intensity correction according to an aspect of the present invention is therefore preferably performed only on a selected subset of the pixels within the region of overlap of the partial images, as will now be detailed.

Therefore, according to some embodiments, the pixel intensity of selected pixels in regions of overlap are reduced (e.g. via a controller, as will be further detailed below) so as to enhance the perceived uniformity of the image when viewed by a viewer.

FIGS. 3A and 3D illustrate examples of angular power intensity distribution (lateral axis only) of the partial images generated by the separate image projector arrangements 20b1, 20a and 20b2 (respectively denoted '(a)', '(b)', and '(c)') after a reduction in the intensity of pixels in part of the overlapping regions of the partial images. FIGS. 3B, 3C and 3E illustrate examples of the lateral angular distribution of pixel intensities when the partial images are combined. It should be noted that FIGS. 3A-3E illustrate theoretical pixel intensity distribution across the field, while in practice the intensity distribution of a given projector arrangement is typically non-uniform across the projected field, and gradually drops off towards the ends of the field.

FIG. 3A is optimized for the viewer's pupil being located at pupil position 15a (see FIGS. 2D-2H), in which case the subset of the pixels in image area 50 that reach the central pupil position from two projectors are reduced to half the intensity, so that after combining the images from all image projector arrangements the pixel intensity reaching the eye will be uniform across the entire image, as shown by the dashed line in FIG. 3B.

However, if the viewer's eye is repositioned to pupil position 15b, (see FIGS. 2D-2G), the intensity of the combined image is no longer uniform, as shown in FIG. 3C, due to the change in the subset of pixels from the overlapping regions which reach the eye from two projectors. The change in pixels which reach the eye due to the different pupil position was described above with reference to FIGS. 2F-2G, where point 1002F went from being viewed from two projectors to being viewed only from one, whereas point 2002F went from being viewed from one projector to being viewed from two.

Therefore, according to some embodiments, the controller may vary the subset of pixels for which the intensity is reduced based on an overlap region adjustment input, e.g. based on the viewer's anticipated or known pupil position. In some embodiments, the overlap region adjustment input may be derived automatically, e.g. via a pupil sensor. In some embodiments, the overlap region adjustment input may be derived by manual input from the user. For example, a test image can be displayed to the user with overlapping parts. The user can be asked to look at various parts of the image and provide input to reduce the intensity of select pixels, such as by actuating a knob or lever coupled to the controller, when the image appears uniform. Alternatively, the user can provide feedback to adjustments made by the controller, for example during a calibration process. The controller receiving such feedback can vary the subset of pixels for intensity reduction until a best approximation for a uniform perceived image is achieved.

By way of example, FIG. 3D illustrates the angular power intensity distribution based on the viewer's eye located at pupil position 15$b$, after having reduced the intensity of the pixels corresponding to image area 50'. Note that the image area 50' for pixel intensity reduction in FIG. 3D are somewhat different than the image area 30 in FIG. 3A due to the different pupil position. After combining the separate images, the intensity across the combined image is made uniform, as shown in FIG. 3E.

It should be noted that pupil position changes when the viewer looks in different directions, i.e., at different parts of the projected image due to rotation of the eye about its center of rotation. Typically, the sensitivity of the human eye to variations in image intensity is much greater in the central region of view, while a person is much more tolerant of intensity variations in their peripheral vision. Accordingly, it is typically sufficient to perform an adjustment to optimize the region of intensity correction for each "seam" (region of overlap) for the pupil position which corresponds to an eye direction looking towards that seam. Thus, for example, the aforementioned manual user adjustment may advantageously be performed as part of a software-guided calibration process in which the user is first instructed to look at a projected calibration image spanning a first seam, e.g., to the left, and to make the manual adjustment until that calibration image appears uniform, and then to look at a projected calibration image spanning a second seam, e.g., to the right, and to make the manual adjustment until that calibration image appears uniform. Those settings may then be used continuously for subsequent projection of images, independent of the instantaneous pupil position, with the understanding that the seam regions of the field of view will be at high quality while the user is looking at them with her central vision, and may be somewhat non-uniform in the peripheral vision.

In some embodiments a pupil sensor can be deployed to dynamically detect eyeball rotation (e.g. as a function of deviation from a predetermined rotation center). Based on the detected eyeball rotation, the controller can determine the subset of pixels to be intensity reduced and make appropriate adjustments, providing full-field uniformity optimization for each instantaneous position of the pupil.

Figures 4A, 4B, 4C:
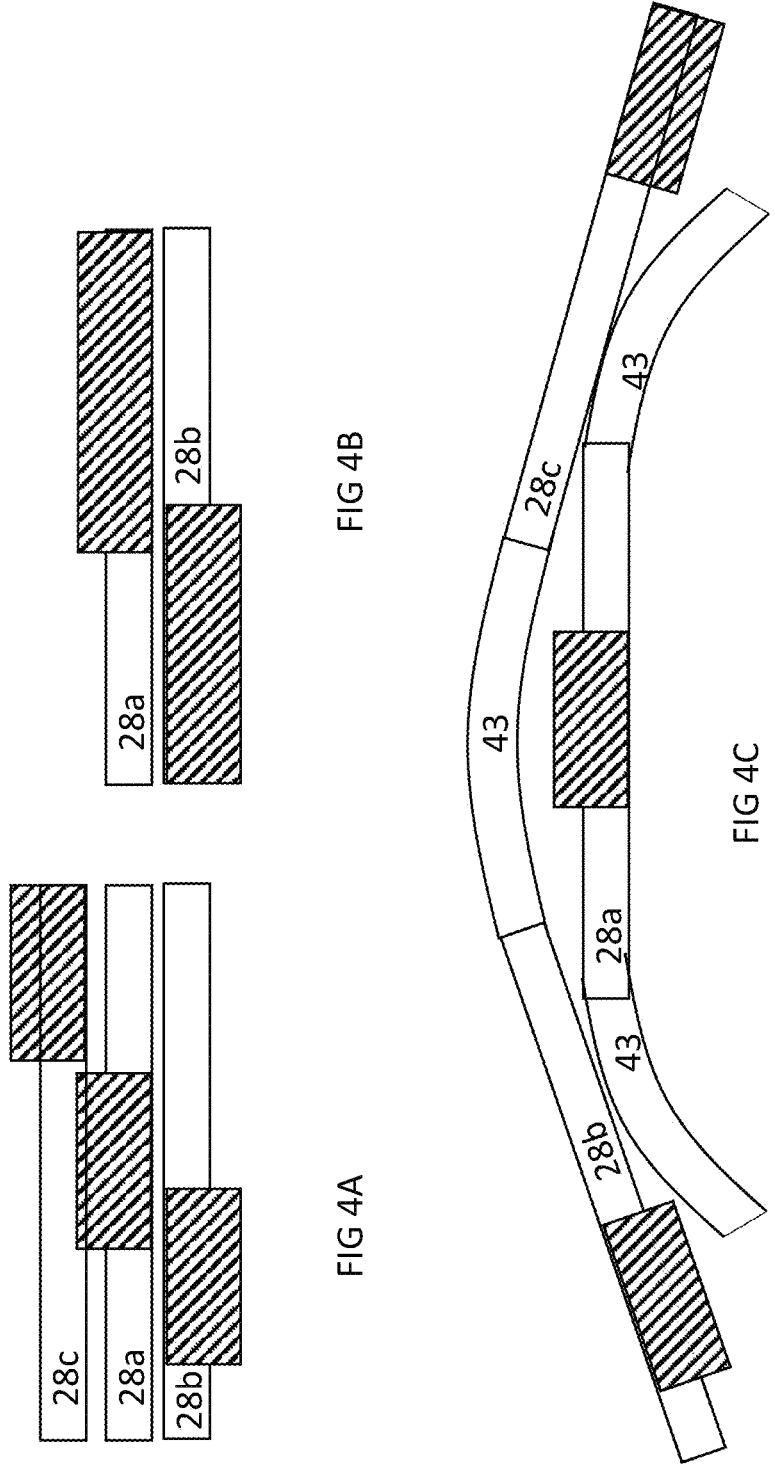
FIGS. 4A-4C illustrate schematically cross-sectional views of different configurations of a display according to the present invention.

FIGS. 4A-4C illustrate schematically cross-sectional views of different configurations of a display according to the present invention.

In some embodiments, the display can include a separate waveguide for each image projector arrangement. In a particularly preferred embodiment, the display includes three projector arrangements, and three corresponding waveguides, as shown in FIG. 4A. The three projector arrangement configuration advantageously allows the middle field, corresponding to the viewer looking at the center of the image (as opposed to looking to the sides) to be generated by the middle projector arrangement only and generally free of overlap and naturally uniform. Parenthetically, both here and in all other implementations described herein, the fields of view of the different projector arrangements do not need to be equal. In certain examples, it may be advantageous to provide a projector arrangement with a relatively larger field of view for the central region of the FOV, while the lateral regions of the overall FOV may be provided by projector arrangements that project a smaller FOV.

FIG. 4B illustrates schematically an alternative embodiment where two projector arrangements are used with corresponding waveguides. This configuration advantageously is relatively simpler to manufacture (as well as operate) due to the reduced number of components. In addition, in this configuration there is advantageously only a single overlapping region that requires intensity adjustment of the pixels therein, as opposed to the three projector arrangement configuration which produces two different overlapping regions. Use of differing sized FOV for the two projectors may allow offsetting of the seam region outside the central region.

FIG. 4C illustrates schematically an embodiment having non-parallel waveguides 41$a$, 41$b$ and 41$c$, which can further expand the image field by orienting the waveguides to extend around or partially encompass the observer (or an eye of the observer). It should be noted that in this embodiment, the edges of the waveguides may be within the field of view of the observer, and might therefore cause a scattering and/or perturbation effect in the viewed image. These effects can be at least partially suppressed or eliminated by introducing an index-matched medium 43 (e.g. such as conformal plastic) between these edges thereby forming an optically smooth transition with the edges of the LOE.

This embodiment can be further extended to multiple light guide panels encompassing any desired angle around the observer, and optionally replicated in two dimensions to provide an overall concave display, which could be extended to form a viewing dome or the like.

Figures 5A, 5B, 5C:
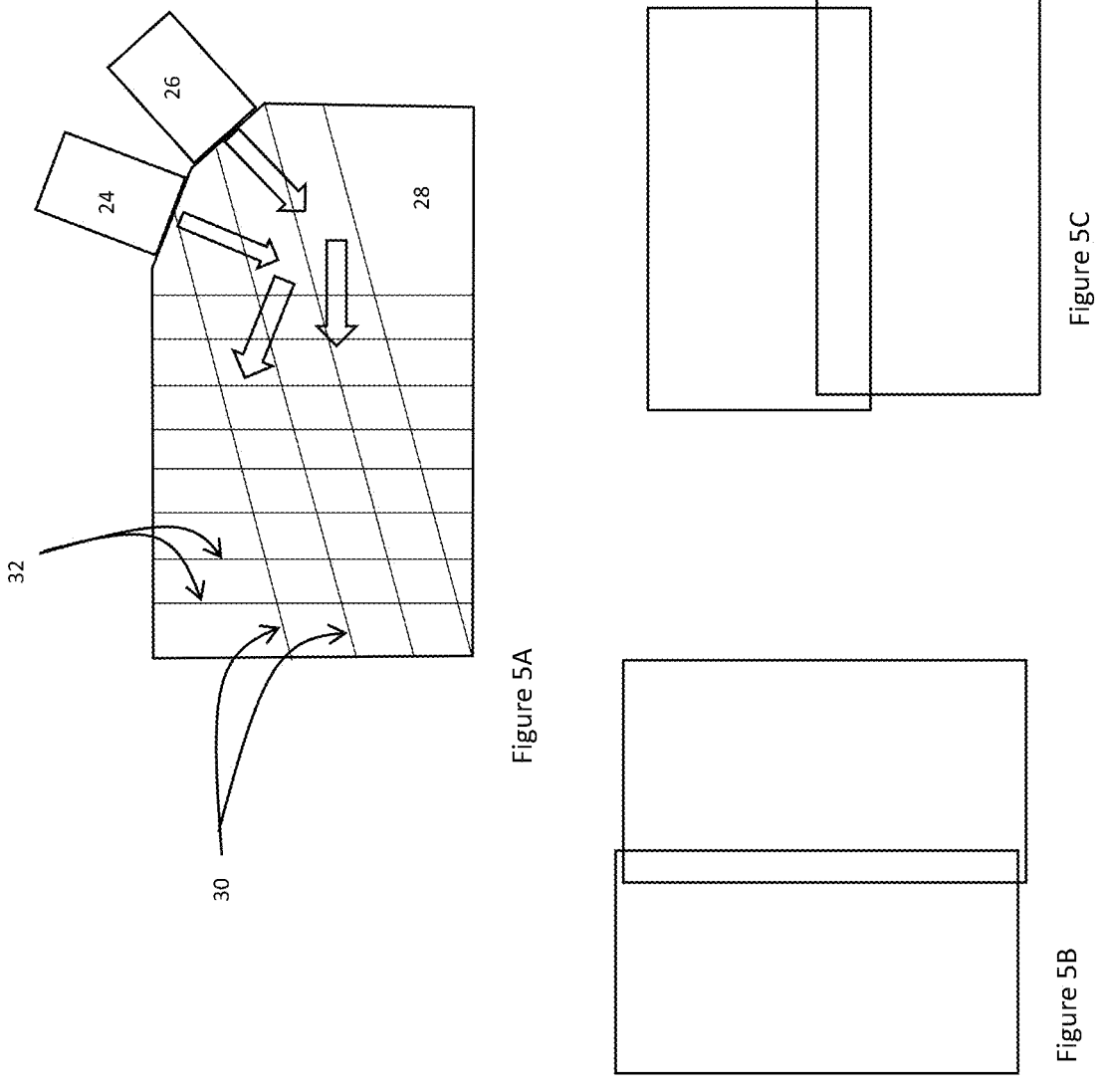
FIG. 5A illustrates schematically a first embodiment of a display configured for 2D image expansion.
FIG. 5B illustrates schematically images combined horizontally.
FIG. 5C illustrates schematically images combined vertically.

FIG. 5A illustrates schematically an embodiment of a display configured for 2D image expansion. In this embodiment, the display has two projector arrangements 24 and 26 deployed to couple-in partial images to a single 2D LOE 28 for 2D image expansion. LOE 28 has two non-parallel sets 30, 32 of mutually parallel facets or diffractive elements. LOEs configured for 2D image expansion are further described in WO 2019/016813 (see, e.g., FIGS. 5A, 6 of that publication).

Projector arrangements 24, 26 project images at two different angles into LOE 28. The light from both projector arrangements is first reflected by facets 30 (thereby expanding aperture in one dimension, e.g. vertically) and subsequently reflected by facets 32 outward toward the observer while simultaneously expanding the aperture in the other dimension, e.g. horizontally. Each projector arrangement generates a partial image, which is then coupled-out to the viewer such that the viewer sees a combined image. Note that the region of overlap between the partial images may be a side-by-side horizontal arrangement as shown in FIG. 5B or a top-bottom vertical arrangement as shown in FIG. 5C. The angle of horizontal or vertical tilt between the projector arrangements 24 and 26 determines the offset between the optical axes of the two projectors, and hence the degree of vertical and horizontal overlap exists in the image viewed by the observer. Note that the actual positioning of the projector arrangements 24 and 26 is typically not critical because two-dimensional aperture expansion is performed by facets 32 and 30 on light from both projector arrangements. Note that in the overlapping region of the field, the intensities projected by the two projector arrangements must be managed in order to maintain uniform intensity. In this case, variations of intensity across the eye-box will be reduced relative to the multiple waveguide configuration.

Figure 6:
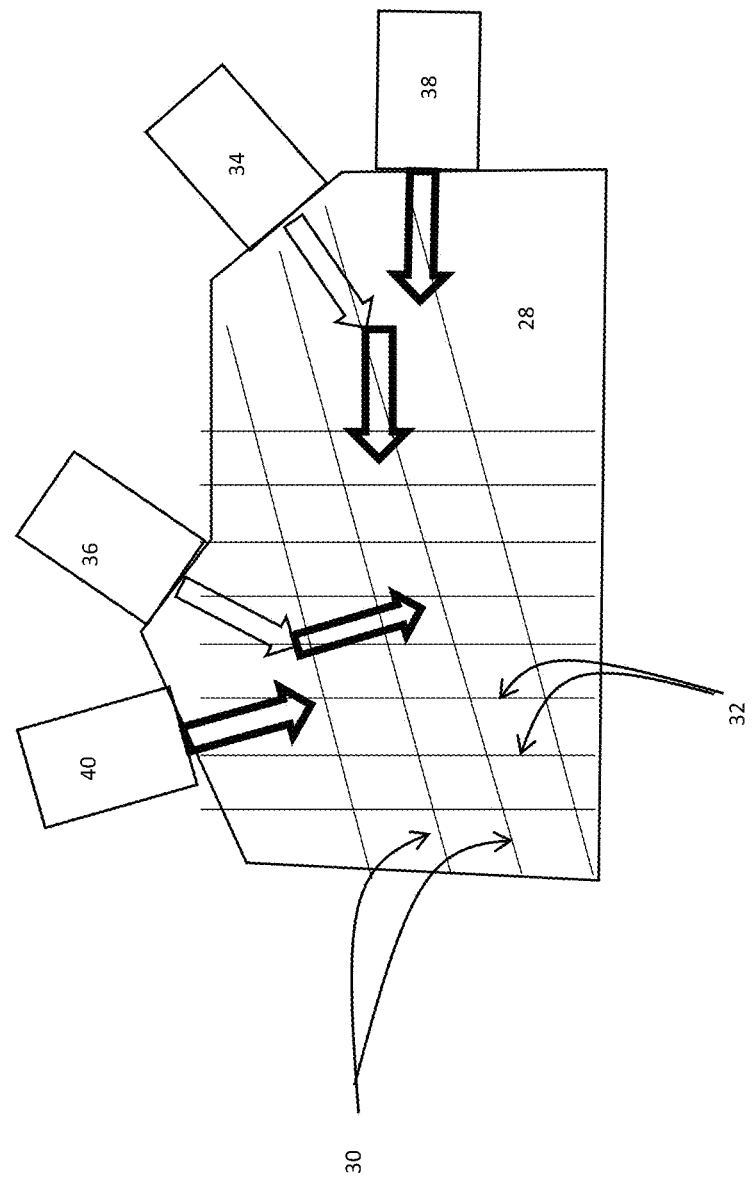
FIG. 6 illustrates schematically a second embodiment of a display configured for 2D image expansion.

FIG. 6 illustrates schematically a second embodiment of a display configured for 2D image expansion. This embodiment uses four projector arrangements. Projector 34 couples-in to LOE 28 partial images for reflection and aperture expansion by facets 30 and then reflection only by facets 32. On the other hand, projector arrangement 36 couples-in to LOE 28 partial images for reflection and aperture expansion by facets 32 and then reflection only by facets 30.

Projector arrangement 38 is oriented to reflect primarily from facets 32 while projector arrangement 40 is oriented for reflection primarily from facets 30. Light from both projector arrangements 38 and 40 experience some back-and-forth reflection between the perpendicular sets of facets 30, 32 causing aperture expansion in both the vertical and horizontal dimensions.

Figure 7:
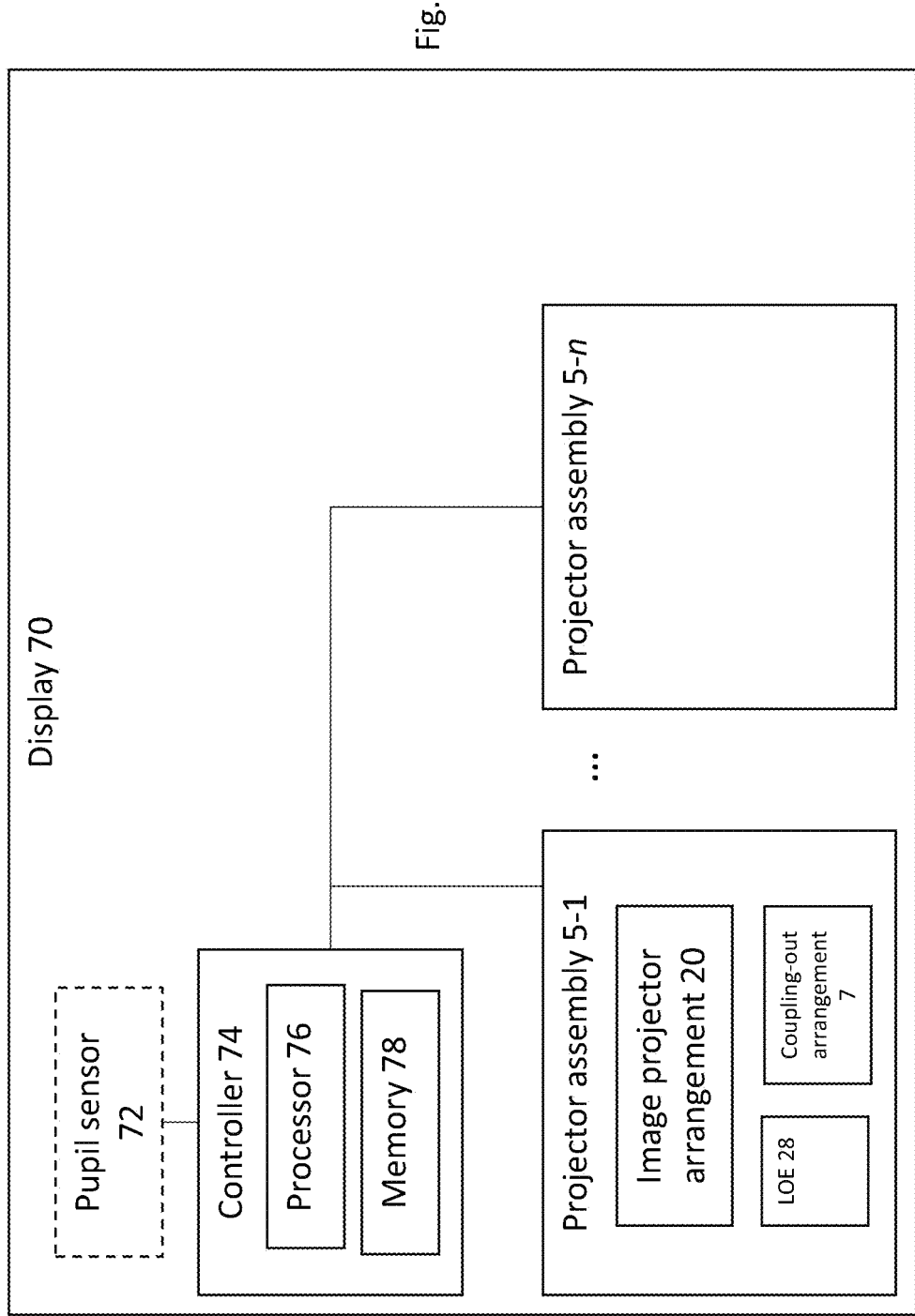
FIG. 7 illustrates schematically an example functional block diagram of a display in accordance with certain embodiments.

FIG. 7 illustrates schematically an example functional block diagram of a display in accordance with certain embodiments. Display 70 includes controller 74, and two or more projector assemblies 5-1-5-_n_.

Each projector assembly 5 includes at least one image projector arrangement 20, and at least one LOE 28 having a pair of parallel external surfaces. Image projector arrangement 20 is configured to generate and project a partial image and is deployed so as introduce the partial image to LOE 28. LOE 28 is configured to propagate the partial image within the LOE by internal reflection from the pair of parallel external surfaces. In some embodiments, each projector assembly includes a coupling-out arrangement 7 associated with LOE 28 and configured for coupling-out the partial image from the LOE towards the eye of the viewer.

In some embodiments, the LOEs 28 of respective projector assemblies are deployed in overlapping relation with one another such that each projector assembly projects a respective partial image corresponding to a respective part of the image to be displayed to the viewer. The respective parts of the image have partial overlap so that the two or more projector assemblies cooperate to display the image to the viewer.

Controller 74 is associated with the image projector arrangements of each projector assembly. Controller 74 includes at least one processor 76 associated with a memory 78. Processor 76, in combination with associated memory 78, is configured to execute one or more functional modules stored in memory 78 for controlling display 70, including, e.g. reducing a pixel intensity of selected pixels projected by at least one image projector arrangement, the selected pixels being in a region of partial overlap between parts of the image, so as to enhance the perceived uniformity of the image displayed to the viewer.

In some embodiments, the controller may be configured to vary the pixel intensities of selected pixels in the region of overlap taking into account any variance in the projector arrangements' pixel intensities projected across the field and the viewer's pupil position within the eye-box.

In some embodiments, the controller may be configured to gradually reduce the intensity of the selected pixels projected by one projector arrangement across the region of partial overlap, and to gradually increase the intensity of the selected pixels projected by the second projector arrangement across the region of partial overlap.

In some embodiments, controller 74 may be coupled to a user input device (not shown) configured for providing user input to controller 74, for example as described above with reference to FIGS. 3A and 3D. In some embodiments, the controller may be physically located within the same housing or different housing than other components of display

70. In some embodiments, different components of the controller may be physically located apart from one another. In some embodiments, the controller is preferably implemented in, but not limited to, a head-mounted display, and most preferably in an eye-glasses form factor.

In some embodiments, display 70 further includes a pupil sensor 72 configured to detect a current pupil position of the viewer, and to update the controller 74 with data indicative of current pupil position.

In some embodiments, controller 74 is configured to determine a subset of common pixels between the partial images, based on the data obtained from the pupil sensor or based on a user input, for which image illumination is arriving at the pupil from two projectors simultaneously, and to implement intensity reduction for that subset of pixels. In some embodiments, the controller is further configured to vary the selection of the subset of common pixels in response to an overlap region adjustment input. The overlap region adjustment input can be derived from the pupil sensor, or from manual user input.

In some embodiments, the controller can be configured to obtain calibration data in cooperation with pupil sensor 72 and store the obtained calibration data in memory 78, and determine the appropriate overlap region adjustment for every pupil position based on the stored calibration data.

Figure 8:
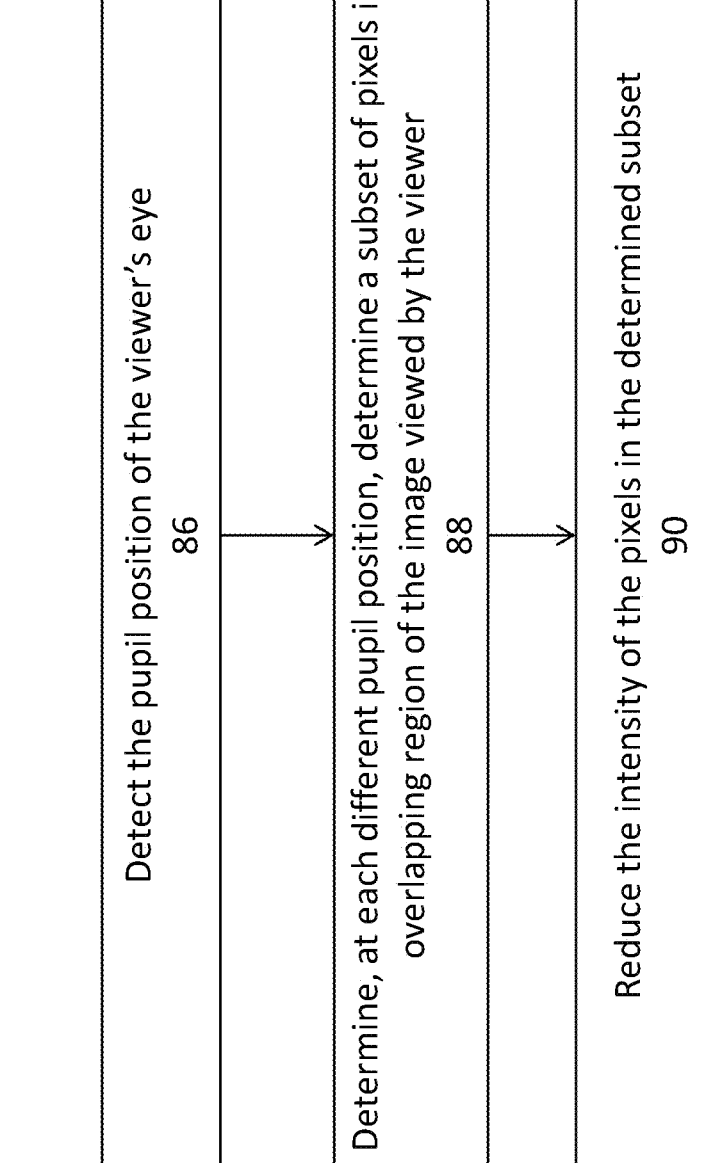
FIG. 8 illustrates an example flow-chart of a method for displaying an image to an eye of a viewer in accordance with certain embodiments.

FIG. 8 illustrates an example flow-chart of a method for displaying an image to an eye of a viewer in accordance with certain embodiments where a sensor is used to detect pupil position of the viewer, either as a one-time calibration process or for ongoing real time adjustment. All steps are performed by processor 76 unless otherwise noted.

At step 86, the pupil sensor detects the pupil position of the viewer's eye.

At step 88, at each different pupil position, determine a subset of pixels in the overlapping region of the image displayed to the viewer.

At step 90, the intensity of pixels within the determined subset is reduced so as to enhance the uniformity of the image displayed to the eye of the viewer. This intensity reduction is typically performed by modifying the image data sent to the projector, reducing the pixel intensity values for the relevant subset of pixels which are sent to both projectors. For example, a pixel with RGB values of (200, 80,168) from the region of perceived overlap could be sent to both projectors as if the pixel data were a dimmer pixel of the same color, such as (100,40,84), assuming ideal linear response of the projector. In practice, the correction may need to be calibrated according to the specific hardware properties of the projector assemblies. Additionally, as described above, the output intensity of the different projector assemblies are typically not uniform across the field, and intensity correction should preferably take into account these non-uniformities.

Although the intensity reduction profile has been illustrated herein as a step function, with 50% intensity being contributed by each projector in the region of perceived overlap, it should be noted that the subdivision of intensity between the two projectors need not be equal for any given pixel, and that the smoothness of the resulting image will typically be greatly enhanced by use of a linear tapering, or an otherwise smoothed transition profile.

FIG. 9A illustrates an embodiment where the visible image intensity progressively hands-off between each two adjacent projectors across the region of perceived overlap, preferably starting at more than 80% intensity at the beginning of the region of perceived overlap, passing 50:50 somewhere in the middle, and reaching less than 20% contribution to the relevant pixel intensity at the outer extremity of the perceived-overlapping pixels for each projector. This progressive variation is preferably monotonic and occurs gradually across the transition area.

FIG. 9B illustrates the intensity distribution in the combined image after the correction by linear tapering as described in FIG. 9A. In some embodiments, if intensity correction is performed by linear or other gradual tapering as described above, preferably with a more gentle slope and over a larger transition area, the corrected image may be well within acceptable limits for viewing at any pupil position, thereby obviating the need to detect pupil positon and perform dynamic correction, as illustrated in FIG. 9C. In the case of a manual user input to adjust the intensity reduction regions, the intensity reduction profile may advantageously be temporarily switched to the step function profile during calibration in order to render the intensity non-uniformity more noticeable, and then switch back to a progressive variation during normal operation. In addition, in cases where the projector arrangements are of the type having gradual spatial intensity attenuation, the progressive intensity degradation described here can be modified according to the attenuation characteristics of the respective projector arrangements, as well as the pupil position within the eye-box, in order to maintain a uniform image intensity as viewed by an eye.

It should be appreciated by those skilled in the art that the displays provided herein may be implemented both in virtual reality and in augmented reality applications (i.e. where virtual display elements are combined with a direct view of the real world).

It will be appreciated that the above descriptions are intended only to serve as examples, and that many other embodiments are possible within the scope of the present invention as defined in the appended claims.

What is claimed is:

1. A display for displaying an image to an eye of an observer comprising:
   (a) a lightguide optical element (LOE) formed from transparent material, the LOE comprising:
      (i) a pair of mutually-parallel major faces for supporting propagation of light within the LOE by internal reflection at the major faces,
      (ii) a redirecting arrangement comprising a first set of mutually-parallel partially-reflecting internal surfaces within the LOE non-parallel to the major surfaces, and
      (iii) a coupling-out arrangement for progressively coupling out light propagating within the LOE towards the eye of the observer;
   (b) a first image projector optically coupled to the LOE so as to introduce light corresponding to a first partial image into the LOE so as to propagate within the LOE by internal reflection at the major surfaces with a first in-plane angular field of view centered on a first in-plane optical axis, the light corresponding to the first partial image being progressively redirected by partial reflection at successive internal surfaces of the first set of mutually-parallel partially-reflecting internal surfaces to propagate within the LOE by internal reflection at the major surfaces towards the coupling-out arrangement with an expanded in-plane effective aperture and then being progressively coupled out by the coupling-out arrangement towards the eye of the observer;
   (c) a second image projector optically coupled to the LOE so as to introduce light corresponding to a second partial image into the LOE so as to propagate within the LOE by internal reflection at the major surfaces with a second in-plane angular field of view centered on a second in-plane optical axis, the second in-plane optical axis being non-parallel to the first in-plane optical axis while a second edge of the first field of view overlaps with a first edge of the second field of view, the light corresponding to the second partial image being progressively redirected by partial reflection at successive internal surfaces of the first set of mutually-parallel partially-reflecting internal surfaces to propagate within the LOE by internal reflection at the major surfaces towards the coupling-out arrangement with an expanded in-plane effective aperture and then being progressively coupled out by the coupling-out arrangement towards the eye of the observer; and
   (d) a controller for actuating the first and second image projectors to project respective first and second partial images having a region of overlap such that the first and second partial images coupled out by the coupling-out arrangement provide to the eye of the observer an image composed partially from the first partial image and partially from the second partial image.

2. The display of claim 1, wherein the first partial image introduced into the LOE by the first projector is incident on a first region of the redirecting arrangement and wherein the second partial image introduced into the LOE by the second projector is incident on a second region of the redirecting arrangement non-identical to the first region.

3. The display of claim 1, wherein the redirecting arrangement is located in a first portion of the LOE and wherein the coupling-out arrangement is located in a second portion of the LOE, the first portion being at least partially non-overlapping with the second portion.

4. The display of claim 1, wherein the coupling-out arrangement comprises a second set of mutually-parallel partially-reflecting internal surfaces deployed within the LOE obliquely-angled to the major surfaces so that the first and second partial images are progressively coupled out by partial reflection at successive internal surfaces of the second set of mutually-parallel partially-reflecting internal surfaces towards the eye of the observer.

5. The display of claim 1, wherein the controller is configured to actuate the first and second image projectors such that, in a region of overlap between the first and second fields of view, a first part of the image intensity is delivered by the first image projector and a second part of the image intensity is delivered by the second image projector.

* * * * *